United States Patent [19]

Lohscheller

[11] Patent Number: 4,896,364
[45] Date of Patent: Jan. 23, 1990

[54] METHOD OF DETECTING BOUNDARY STRUCTURES IN A VIDEO SIGNAL

[75] Inventor: Herbert Lohscheller, Aspach, Fed. Rep. of Germany

[73] Assignee: ANT Nachrichtentechnik GmbH, Backnang, Fed. Rep. of Germany

[21] Appl. No.: 936,247

[22] Filed: Dec. 1, 1986

[30] Foreign Application Priority Data

Nov. 30, 1985 [DE] Fed. Rep. of Germany ........ 3542484

[51] Int. Cl.$^4$ .............................................. G06K 9/48
[52] U.S. Cl. ....................................... 382/22; 382/27; 382/52
[58] Field of Search ....................... 382/21, 22, 27, 51, 382/53, 25, 41, 49, 52, 60, 50

[56] References Cited

U.S. PATENT DOCUMENTS

| | | | |
|---|---|---|---|
| 3,717,847 | 2/1973 | Kakuta | 382/60 |
| 3,899,771 | 8/1975 | Saraga | 382/21 |
| 3,982,227 | 9/1976 | Joynson | 382/21 |
| 4,156,231 | 5/1979 | Edamatsu | 382/28 |
| 4,174,514 | 11/1979 | Sternberg | 382/49 |
| 4,189,711 | 2/1980 | Frank . | |
| 4,205,341 | 5/1980 | Mitsuya | 358/260 |
| 4,326,190 | 4/1982 | Borland | 382/21 |
| 4,399,461 | 8/1983 | Powell | 382/54 |
| 4,501,016 | 2/1985 | Persoon | 382/52 |
| 4,506,382 | 3/1985 | Hada | 382/54 |
| 4,577,235 | 3/1986 | Kannapell | 382/52 |
| 4,578,715 | 3/1986 | Yamaguchi | 382/53 |
| 4,593,325 | 6/1986 | Kannapell | 358/282 |
| 4,669,123 | 5/1987 | Kobayashi | 382/21 |
| 4,677,479 | 6/1987 | Hatori | 382/50 |

FOREIGN PATENT DOCUMENTS 0148959 12/1983 European Pat. Off. .
0149457 1/1989 European Pat. Off. .
3501830 7/1985 Japan .
2121534 4/1983 United Kingdom .

OTHER PUBLICATIONS

William K. Pratt, "Two-Dimensional Unitary Transforms", *Digital Image Processing* (1978), pp. 232 to 278 and pp. 471-499.
Hyde et al, "Subpixel Edge Estimation", Pattern Recognition, vol. 16, No. 4, 1983, pp. 413-420.
Patent Abstracts of Japan, vol. 6, No. 12, Jan. 23, 1982.

*Primary Examiner*—Leo H. Boudreau
*Assistant Examiner*—Joseph Mancuso
*Attorney, Agent, or Firm*—Spencer & Frank

[57] ABSTRACT

A method of detecting edge structures in a video signal, with a decision criterion being derived from the environment pixels of an image pixel so as to realize image coding with the least number of bits possible. The object of detecting all of the oblique edges i.e. edges which are not horizontal or vertical, is accomplished in that an average is formed from the environment pixels of an image pixel and this average is then compared with each environment pixel so as to obtain an output signal having one of three-values (1, 0, -1) dependiing on whether the luminance or chrominance values of the particular environment pixel is above, within or below a given tolerance range. A conclusion as to the existence of an edge and its orientation is then drawn from the number of immediately consecutive identical positive or negative values (1 or -1) of this possible three-valued signal for an image pixel and from the position of the changes in value within the sequence of environment pixels.

10 Claims, 11 Drawing Sheets

```
0001    C
0002    C   USE PROGRAM FOR EDGE DETECTION WITH DIFFERENT OPERATORS
0003    C   CALL:   $RUN DETEKANT([FILE1],[FILE2]=FILE3\P1,P2,P3,P4,P5)
0004    C
0005    C   PARAMETER:      FILE1 = OUTPUT FOR OPERATOR-FILE
0006    C                   FILE2 = EDGE OPERATOR 0 = NO EDGES
0007    C                   FILE3 = INPUT PICTURE DATA (STRUCTURE B / TYPE BYTE)
0008    C
0009    C                   P1    = OPERATOR CONTROL
0010    C                       4 = OBLIQUE OPERATOR
0011    C
0012    C                   P2    = THRESHOLD FOR THE OPERATORS
0013    C
0014    C                   P3    = LINE PRINTER LISTING
0015    C                       2 = WITH HEADING
0016    C                   P4    = CONTROL PARAMETER FOR OBLIQUE OPERATOR
0017    C                       0 = DEFAULT (N.H.&N.V.&N.D.)
0018    C                       1 = HORIZ.
0019    C                       2 = VERTIK.
0020    C                       4 = DIAG.
0021    C                    10+I = DEFAULT + I
0022    C
0023    C                   P5    = MIN. EDGE POINT/EDGE BLOCK
0024    C
0025    C        ================================================================
0026    C                   COMMON - BLOCKS
0027    C        ================================================================
0028    C
0029            COMMON/INITPARAM/ KENFIL(7) ,FILE(64,7) ,SWITCH(2,7)
0030           *                 ,SWTARG(2,7) ,PARAM(24) ,MNB(3) ,MNBAKT(3)
0031           *                 ,LTR(3)
0032    C
0033            COMMON/CALLCOM/ ORT(130,5)
0034           *                ,STRING ,LEN_STR
0035           *                ,IMAGNAME ,LEN_NAM
0036           *                ,IB_FLAG ,ERR_FLAG(5) ,LOOP_FLAG ,DYL_FLAG
0037           *                ,LOOP_CNT ,CPU_TIM ,CPU_FLAG
0038    C
0039            COMMON/ITEMLST/ W_LEN1 ,W_CODE1 ,L_ADDR1 ,L_LENADDR1 ,ERR
0040    C
0041    C        ================================================================
0042    C          REAL
0043    C        ================================================================
0044            REAL*4 PARAM
0045    C        ================================================================
0046    C          INTEGER
0047    C        ================================================================
0048            INTEGER*2 MNB ,MNBAKT ,LTR
0049            INTEGER*2 LEN_STR ,LEN_NAM ,LOOP_CNT
0050            INTEGER*2 IB_FLAG ,ERR_FLAG ,LOOP_FLAG ,DYL_FLAG ,CPU_FLA
0051            INTEGER*2 W_LEN1 ,W_CODE1
0052            INTEGER*4 L_ADDR1 ,L_LENADDR1 ,ERR_COD1
0053            INTEGER*4 CPU_TIM
0054    C        ================================================================
0055    C          BYTE
0056    C        ================================================================
0057            BYTE FILE ,SWITCH ,SWTARG ,KENFIL
0058    C        ================================================================
0059    C          CHARACTER
0060    C        ================================================================
0061            CHARACTER*1      ORT
0062            CHARACTER*130    STRING
0063            CHARACTER*64     IMAGNAME
0064    C
```

FIGURE 3a

```
0065    C LOCAL DATA BUFFERS
0066    C
0067            BYTE            IDAT(64),IOPERA(64),INTB
0068            REAL            ANZ,ANZKANT
0069    C
0070    C INITIALIZING THE COMMON BLOCKS AND PARAMETERS
0071    C
0072    5       CALL USEMES('*** DETEKANT.EXE ***')
0073            NREA = (MNBAKT(1)/LTR(1))*(MNBAKT(2)/LTR(2))
0074            NDIM = LTR(1)
0075            NANZ = NDIM*LTR(2)
0076            KANT = 0
0077            ANZ = 0.
0078            ANZKANT = 0.
0079            IPOP = 1
0080            IF (PARAM(1).NE.0) IPOP = PARAM(1)
0081            SWPAR =0.
0082            IF (PARAM(2).NE.0) SWPAR = PARAM(2)
0083            ISTEU = 0
0084            IF (PARAM(4).NE.0) ISTEU = PARAM(4)
0085            IANZ=1
0086            IF (PARAM(5).NE.0) IANZ = PARAM(5)
0087            CALL DEFFIL(LOG3,3,1,1)
0088            IF(KENFIL(1).NE.0)CALL DEFFIL(LOG1,1,1,1)
0089            LOG2 = 0
0090            IF (KENFIL(2).NE.0) CALL DEFFIL(LOG2,2,1,1)
0091    C
0092    C PROCESSING ROUTINE
0093    C
0094            DO 100 K = 1,NREA
0095            CALL DYLOOP(K,NREA)
0096            READ(LOG3)(IDAT(L1),L1=1,NANZ)
0097    C
0098    C EDGE POINT DECODER
0099    C
0100    40      CALL EDGEPOINT(IDAT,NDIM,IOPERA,SWPAR,ANZ,ANZKANT,ISTEU)
0101    C
0102    C EDGE BLOCK DECODER
0103    C
0104            CALL EDGEBLOCK(IOPERA,NDIM,IKANT,IANZ,ISTEU)
0105    90      IF (KENFIL(1).NE.0) WRITE(LOG1)(IOPERA(L1),L1=1,NANZ)
0106            KANT = KANT + IKANT
0107            IF (KENFIL(2).NE.0) WRITE(LOG2) IKANT
0108    100     CONTINUE
0109            IF (KENFIL(1).NE.0) CALL CLOSE(LOG1)
0110            IF (KENFIL(2).NE.0) CALL CLOSE(LOG2)
0111            IF (PARAM(3).EQ.0) GOTO 300
0112            IF (PARAM(3).EQ.2) CALL TITLE
0113            PROZK = 100.* ANZKANT/ANZ
0114            PROZBL = 100.* KANT/NREA
0115            WRITE (6,999)
0116    999     FORMAT(//,T5,'OPERATOREN : 4 = OBLIQUE'//)
0117            WRITE (6,1000)IPOP,SWPAR,ANZKANT,ANZ,KANT,NREA,PROZK,PROZBL
0118    1000    FORMAT(T5,'RESULTS FOR OPERATOR ',I2,12X,' WITH A THRESHOLD ',
0119           1'OF ',F12.1,///,T5,'EDGE-POINTS = ',F11.1,10X,' OF TOTALLY',
0120           1' = ',F17.1,' POINTS'//,T5,'EDGE-BLOCKS = ',I11,10X,' OF TO',
0121           1'TALLY = ',I19,' BLOCKS',//,T5,'RELA. EDGEPOINTS = ',F6.2,
0122           110X,' RELA. EDGEBLOCKS = ',F15.2)
0123    300     CALL CLOSE(LOG3)
0124            CALL USEFIN
0125            STOP
0126            END
```

FIGURE 3b

```
0001    C
0002    C
0003            SUBROUTINE EDGEPOINT(IDAT,N,IOP,SWPAR,ANZ,ANZKANT,ISTEU)
0004    C
0005            BYTE            IDAT(N,N),IOP(N,N),INTB
0006            INTEGER*2       INT3,IZ(9)
0007            LOGICAL*2       IDEF,IHOR,IVER,IDIA
0008    C
0009    C   CONTROLPARAMETER DECODING
0010    C
0011            IDEF = .FALSE.
0012            IHOR = .FALSE.
0013            IVER = .FALSE.
0014            IDIA = .FALSE.
0015            IF (ISTEU.EQ.0)THEN
0016               IDEF = .TRUE.
0017            ELSE
0018              IF(ISTEU.GE.8)THEN
0019                 IDEF = .TRUE.
0020              ENDIF
0021              IHOR = BTEST(ISTEU,0)
0022              IVER = BTEST(ISTEU,1)
0023              IDIA = BTEST(ISTEU,2)
0024            ENDIF
0025    C
0026    C
0027            IKANT = 0
0028            DO 100 I = 2,N-1
0029            DO 100 J = 2,N-1
0030            ANZ = ANZ + 1
0031    C
0032    C WINDOW RESTORING
0033    C
0034            IZ(1) = INT3(IDAT(I-1,J-1))
0035            IZ(2) = INT3(IDAT(I-1,J))
0036            IZ(3) = INT3(IDAT(I-1,J+1))
0037            IZ(4) = INT3(IDAT(I,J+1))
0038            IZ(5) = INT3(IDAT(I+1,J+1))
0039            IZ(6) = INT3(IDAT(I+1,J))
0040            IZ(7) = INT3(IDAT(I+1,J-1))
0041            IZ(8) = INT3(IDAT(I,J-1))
0042            IZ(9) = IZ(1)
0043    C
0044    C MEAN CALCULATION
0045    C
0046            IM = 0
0047            DO 10 K = 1,8
0048            IM = IM + IZ(K)
0049    10      CONTINUE
0050            IM = IM/8
0051    C
0052    C THREE VALUED SIGNAL DETERMINATION
0053    C
0054            IM1 = 0
0055            IP1 = 0
0056            IZZ = 0
0057            DO 20 K = 1,8
0058            K1 = (IZ(K)-IM)
0059            IF (K1.GT.SWPAR) THEN
0060               IZ(K) = 1
0061               IP1 = IP1+1
0062            ELSE
0063              IF(IABS(K1).LE.SWPAR)THEN
0064                 IZZ = IZZ+1
```

FIGURE 3c

```
0065                    IZ(K) = 0
0066                  ELSE
0067                    IM1 = IM1+1
0068                    IZ(K) = -1
0069                  ENDIF
0070                ENDIF
0071      20      CONTINUE
0072      C
0073      C EDGE-POINT DECODING
0074      C
0075              IZ(9) = IZ(1)
0076              IV = 0
0077              ISUM = 0
0078      C
0079      C ENVIROMENT PIXEL SUM AND NUMBER OF SIGN CHANGES
0080      C
0081              DO 30 K = 2,9
0082              ISUM = ISUM + IZ(K)
0083              K1 = IZ(K)-IZ(K-1)
0084              IF (K1 .NE. 0) THEN
0085                IV = IV+1
0086              ENDIF
0087              IZ (K-1) = K1
0088      30     CONTINUE
0089      C
0090      C DECODING LOGIK
0091      C
0092              IOP(I,J) = INTB(128)
0093              IF (IZZ .EQ. 0) THEN
0094                IF (IV .EQ. 2) THEN
0095      C
0096      C DEFAULT DECODING PART
0097      C
0098                  IF(IDEF)THEN
0099                    IF(IM1.EQ.4 .AND. IP1.EQ.4) THEN
0100                      ANZKANT = ANZKANT+1
0101                      IOP(I,J) = 1
0102                      GOTO 100
0103                    ENDIF
0104                  ENDIF
0105      C
0106      C HORIZONTAL DECODING PART
0107      C
0108                  IF(IHOR)THEN
0109                    IF (ISUM .EQ. 2)THEN
0110                      IF(IZ(3).EQ.2.OR.IZ(7).EQ.2)THEN
0111                        ANZKANT = ANZKANT+1
0112                        IOP(I,J) = 1
0113                        GOTO 100
0114                      ENDIF
0115                    ENDIF
0116                    IF (ISUM .EQ.-2)THEN
0117                      IF(IZ(4).EQ.2.OR.IZ(8).EQ.2)THEN
0118                        ANZKANT = ANZKANT+1
0119                        IOP(I,J) = 1
0120                        GOTO 100
0121                      ENDIF
0122                    ENDIF
0123                  ENDIF
0124      C
0125      C VERTIKAL DECODING PART
0126      C
0127                  IF(IVER)THEN
0128                    IF (ISUM .EQ. 2)THEN
```

FIGURE 3d

```
0129              IF(IZ(1).EQ.2.OR.IZ(5).EQ.2)THEN
0130                ANZKANT = ANZKANT+1
0131                IOP(I,J) = 1
0132                GOTO 100
0133              ENDIF
0134            ENDIF
0135            IF (ISUM .EQ.-2)THEN
0136              IF(IZ(2).EQ.2.OR.IZ(6).EQ.2)THEN
0137                ANZKANT = ANZKANT+1
0138                IOP(I,J) = 1
0139                GOTO 100
0140              ENDIF
0141            ENDIF
0142          ENDIF
0143   C
0144   C DIAGONAL DECODING PART
0145   C
0146          IF(IDIA)THEN
0147            IF (ISUM .EQ. 2)THEN
0148              IF(IZ(2).EQ.2.OR.IZ(4).EQ.2
0149       *         .OR.IZ(6).EQ.2.OR.IZ(8).EQ.2)THEN
0150                ANZKANT = ANZKANT+1
0151                IOP(I,J) = 1
0152                GOTO 100
0153              ENDIF
0154            ENDIF
0155            IF (ISUM .EQ.-2)THEN
0156              IF(IZ(1).EQ.2.OR.IZ(3).EQ.2
0157       *         .OR.IZ(5).EQ.2.OR.IZ(7).EQ.2)THEN
0158                ANZKANT = ANZKANT+1
0159                IOP(I,J) = 1
0160                GOTO 100
0161              ENDIF
0162            ENDIF
0163          ENDIF
0164          IOP(I,J) = 0
0165        ELSE
0166          IOP(I,J) = 0
0167        ENDIF
0168      ELSE
0169        IOP(I,J) = 0
0170      ENDIF
0171   100   CONTINUE
0172        RETURN
0173        END
```

FIGURE 3e

```
0001       C
0002                   SUBROUTINE EDGEBLOCK(IOP,N,IKANT,IANZ,ISTEU)
0003       C
0004               BYTE            IOP(N,N),INTB
0005               INTEGER*2       INT3
0006               LOGICAL*2       IDEF,IHOR,IVER,IDIA
0007       C
0008       C   CONTROLPARAMETER DECODING
0009       C
0010               IDEF = .FALSE.
0011               IHOR = .FALSE.
0012               IVER = .FALSE.
0013               IDIA = .FALSE.
0014               IF (ISTEU.EQ.0)THEN
0015                  IDEF = .TRUE.
0016               ELSE
0017                  IF(ISTEU.GE.8)THEN
0018                     IDEF = .TRUE.
0019                  ENDIF
0020                  IHOR = BTEST(ISTEU,0)
0021                  IVER = BTEST(ISTEU,1)
0022                  IDIA = BTEST(ISTEU,2)
0023               ENDIF
0024       C
0025       C EDGE-POINT COUNTER
0026       C
0027               IKANT = 0
0028               IEP = 0
0029               DO 10 K = 1,8
0030               DO 10 L = 1,8
0031               IF (IOP(K,L).EQ.0)THEN
0032                  GOTO 10
0033               ELSE
0034                  IEP = IEP+1
0035               ENDIF
0036       10      CONTINUE
0037       C
0038       C EDGE-BLOCK DECODING
0039       C
0040               IF(IANZ.EQ.1) THEN
0041                  IF (IEP.GE.1) THEN
0042                     IKANT = 1
0043                     GOTO 100
0044                  ENDIF
0045               ENDIF
0046       C
0047       C HORIZONTAL DECODING PART
0048       C
0049               IF (IHOR) THEN
0050                  DO 20 K = 2,7
0051                  DO 20 L = 2,7
0052                  NEXT = 1
0053                  IF (IOP(K,L).EQ.0) THEN
0054                     GOTO 20
0055                  ELSE
0056       15           L1 = L+NEXT
0057                     IF (IOP(K,L1).EQ.0) THEN
0058                        GOTO 20
0059                     ELSE
0060                        NEXT = NEXT+1
0061                        IF (NEXT.EQ.IKANT) THEN
0062                           IKANT = 1
0063                           GOTO 100
0064                        ELSE
```

FIGURE 3f

```
0065                    GOTO 15
0066                 ENDIF
0067              ENDIF
0068           ENDIF
0069    20     CONTINUE
0070        ENDIF
0071   C
0072   C VERTIVAL DECODING PART
0073   C
0074        IF (IVER) THEN
0075           DO 30 K = 2,7
0076           DO 30 L = 2,7
0077           NEXT = 1
0078           IF (IOP(K,L).EQ.0) THEN
0079              GOTO 30
0080           ELSE
0081    25        K1 = K+NEXT
0082              IF (IOP(K1,L).EQ.0) THEN
0083                 GOTO 30
0084              ELSE
0085                 NEXT = NEXT+1
0086                 IF (NEXT.EQ.IKANT) THEN
0087                    IKANT = 1
0088                    GOTO 100
0089                 ELSE
0090                    GOTO 25
0091                 ENDIF
0092              ENDIF
0093           ENDIF
0094    30     CONTINUE
0095        ENDIF
0096   C
0097   C DIAGONAL DECODING PART
0098   C
0099        IF (IDIA) THEN
0100           DO 40 K = 2,7
0101           DO 40 L = 2,7
0102           NEXT = 1
0103           IF (IOP(K,L).EQ.0) THEN
0104              GOTO 40
0105           ELSE
0106    35        L1 = L+NEXT
0107              K1 = K+NEXT
0108              IF (IOP(K1,L1).EQ.0) THEN
0109                 GOTO 40
0110              ELSE
0111                 NEXT = NEXT+1
0112                 IF (NEXT.EQ.IKANT) THEN
0113                    IKANT = 1
0114                    GOTO 100
0115                 ELSE
0116                    GOTO 35
0117                 ENDIF
0118              ENDIF
0119           ENDIF
0120    40     CONTINUE
0121        ENDIF
0122   C
0123   C DEFAULT DECODING PART
0124   C
0125        IF (IDEF) THEN
0126           DO 50 K = 2,7
0127           DO 50 L = 2,7
0128    41     NEXT = 1
```

FIGURE 3g

```
0129            IF (IOP(K,L).EQ.0) THEN
0130               GOTO 50
0131            ELSE
0132    42         L1 = L+NEXT
0133               IF (IOP(K,L1).EQ.0) THEN
0134                  GOTO 43
0135               ELSE
0136                  NEXT = NEXT+1
0137                  IF (NEXT.EQ.IKANT) THEN
0138                     IKANT = 1
0139                     GOTO 100
0140                  ELSE
0141                     GOTO 42
0142                  ENDIF
0143               ENDIF
0144            ENDIF
0145    43      NEXT1 = 1
0146            L1 = L1-1
0147    44      K1 = K+NEXT1
0148            IF (IOP(K1,L1).EQ.0) THEN
0149               GOTO 45
0150            ELSE
0151               NEXT1 = NEXT1+1
0152               NEXT = NEXT + 1
0153               IF (NEXT.EQ.IKANT) THEN
0154                  IKANT = 1
0155                  GOTO 100
0156               ELSE
0157                  GOTO 44
0158               ENDIF
0159            ENDIF
0160    45      NEXT1 = 1
0161            K1 = K1-1
0162    46      K2 = K1+NEXT1
0163            L2 = L1+NEXT1
0164            IF (IOP(K2,L2).EQ.0) THEN
0165               GOTO 47
0166            ELSE
0167               NEXT1 = NEXT1+1
0168               NEXT = NEXT+1
0169               IF(NEXT.EQ.IKANT) THEN
0170                  IKANT = 1
0171                  GOTO 100
0172               ELSE
0173                  GOTO 46
0174               ENDIF
0175            ENDIF
0176    47      L1 = L2-1
0177            K1 = K2-1
0178            NEXT1 = 1
0179    48      K2 = K1+NEXT1
0180            L2 = L1-NEXT1
0181            IF (IOP(K2,L2).EQ.0) THEN
0182               GOTO 50
0183            ELSE
0184               NEXT1 = NEXT1+1
0185               NEXT = NEXT+1
0186               IF(NEXT.EQ.IKANT) THEN
0187                  IKANT = 1
0188                  GOTO 100
0189               ELSE
0190                  GOTO 48
0191               ENDIF
0192            ENDIF
```

FIGURE 3h

```
0193    50    CONTINUE
0194          ENDIF
0195    100   RETURN
0196          END
```

FIGURE 3i

METHOD OF DETECTING BOUNDARY STRUCTURES IN A VIDEO SIGNAL

BACKGROUND OF THE INVENTION

The present invention relates to a method of detecting the discontinuity structures in the luminance and/or chrominance components of a video signal, with a decision criterion being derived from the environment of an image pixel so as to effect image coding with the smallest number of bits possible.

Such methods are known, for example from the book entitled "Digital Image Processing" by William K. Pratt, A Wiley Interscience Publication; John Wiley & Sons, New York, Chichester, Brisbane, Toronto, 1978, Chapter 17: "Image Feature Extraction", pages 471-499. Here various methods for detecting the discontinuities in a video signal are introduced and compared. The ability to distinguish between structures and non-structures is quite good in these various methods and the costs to implement them, for example with respect to the number of multiplications, differs. However, it is difficult with the prior art methods to detect the orientation of edges. In particular, orientations which are not horizontal, vertical or at an angle of less than 45° with respect to the horizontal cannot be detected. Moreover, the prior art methods are very sensitive with respect to fixing their decision thresholds.

SUMMARY OF THE INVENTION

It is an object of the invention to provide a method for detecting discontinuities in particular edges in the luminance and/or chrominance components of a video signal which method is particularly suited for the detection of edges having an orientation that is not horizontal, vertical or disposed at an angle less than 45° with respect to the horizontal, and to do this with less expenditures than in the past. The method should also be suitable for processing non-moving images.

The above object is generally achieved according to the present invention by a method of detecting the edges in a video signal, with a decision criterion being derived from the environment of a pixel so as to effect image coding with the least number of bits, with the method comprising the steps of: subdividing the entire image into partial image regions (blocks) which are non-overlapping and fixed sized and each individually coded as to luminance or chrominance components; from each of these partial image regions, forming a plurality of windows with a block each composed of one image pixel and its immediately adjacent environment pixels; storing the luminance or chrominance values of the pixels in a shift register wherein the sequence of said storing is effected linewise from top to bottom within each block; for each window, reading out only the immediately adjacent environment pixels of an image pixel from the shift register in parallel and calculating an average luminance or chrominance value from the read out values; for each said window, individually comparing the respectively determined average value with the associated adjacent environment pixels taken from the shift register for each image pixel and providing a respective output signal having one of three different digital values depending on whether the luminance or chrominance value of an environment pixel lies above, within, or below a given tolerance range; intermediately storing the three valued individual output signals; and utilizing the three valued output signals to detect an edge and the orientation of such detected edge with the number of the respective values of the output signal and their sequence in a fixed direction around the associated image pixel defining the orientation of the detected edge.

Preferably, the method according to the invention further includes the step of: identifying each image pixel associated with the detected edge as an edge pixel by providing a respective binary value and each image pixel not associated with a detected edge with the respective other binary value; determining whether the number of identified edge pixels exceed a freely selectable threshold value and whether these detected edge pixels are in immediate local connection and, if so, identifying this partial image region in its entirety as an edge block by means of a binary value; and utilizing this edge block identifying binary value for an entire partial image region to control an image coding algorithm.

According to one feature of the invention, wherein the three different digital values are a positive value (+1), a zero value (0) and a negative value (−1) respectively, and wherein there are eight environment pixels in each said window, the step of utilizing includes drawing a conclusion as to the orientation of an edge from a contiguous sequence of the stored individual output signals of the eight environment pixels around one image pixel in that, if there are four immediately consecutive positive values (1) and four immediately consecutive negative values (−1), the edge curve is oblique and the position of the changes in value from positive to negative (1, −1) and from negative to positive (−1, 1) within the sequence of eight environment pixels determines the inclination of the edge curve.

According to another feature of the invention, the step of utilizing further includes drawing a further conclusion as to the orientation of an edge from a contiguous sequence of the stored individual output signals of the eight environment pixels around one image pixel in that, if the ratio of immediately consecutive positive (1) and negative (−1) values is three/five or, conversely, five/three, the edge curve is determined to be either vertical, diagonal, or horizontal depending on the particular position of the change in value from a chain of three to a chain of five within the environment pixels.

BRIEF DESCRIPTION OF THE DRAWINGS

One embodiment of the invention will be described in greater detail below with reference to the drawing figures.

FIGS. 3a to 3i, show a computer program listing in fortran for carrying out the method according to the inventor.

DETAILED DESCRIPTION OF THE PREFERRED EMBODIMENT

Figure 2:
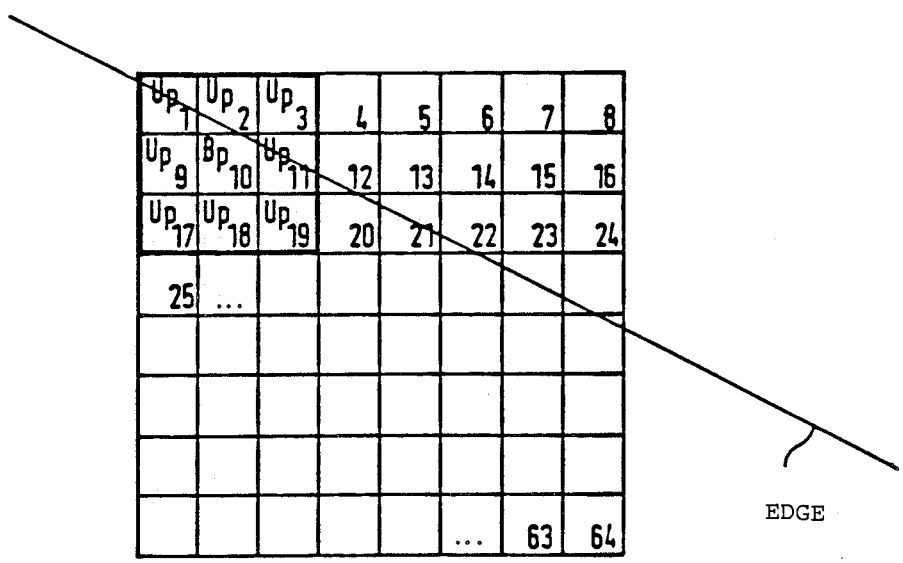
FIG. 2 shows a partial region of 64 pixels of the image with an oblique edge, wherein Bp=an image pixel, and Up=an environment pixel.

Referring now to the drawings, initially the entire nonmoving image is subdivided into a plurality of partial image regions (blocks), one of which is shown, for example, in FIG. 2. These blocks are non-overlapping and of fixed sized. Each of the partial image regions is then separately coded as to luminance or chrominance of the individual pixels in a manner well known in the art, e.g. "Digital Image Processing" by W.K. Pratt (ref: page 2) pages 232-278.

From the partial image regions (blocks), m windows, each composed of one image pixel Bp and its surrounding environment pixels Up, have their luminance or chrominance values (intensity) written into a shift register 10 (see FIG. 1) wherein the sequence of said storing is effected linewise from top to bottom within each block. Each window, the first one is shown in FIG. 2, consists of a 3×3 matrix composed of an image pixel Bp10 and its eight surrounding environment pixels Up1, Up2, Up3, Up11, Up19, Up18, Up17 and Up9 in a clockwise fashion. The outputs $X_1, X_2, X_3, X_9, X_{11}, X_{17}, X_{18}, X_{19}$ of the shift register 10 represent all environment pixels and they are connected in parallel to an average former 12 including for example, seven full adders, for forming the average value of the brightness of the environment pixels Up. Preferably the windows of a partial image region (block) are processed consecutively from image pixel to image pixel of a row so that, for example, the image pixels of the subsequent windows would be the pixels Bp11, Bp12, Bp13 etc. The number of stored pixels in the shift register depends on the number of processing steps n of the average former 12, since after formation of the first average, the stored image pixel Bp and its associated environment pixels Up have in the meantime been shifted forward by n clock pulses.

Figure 1:
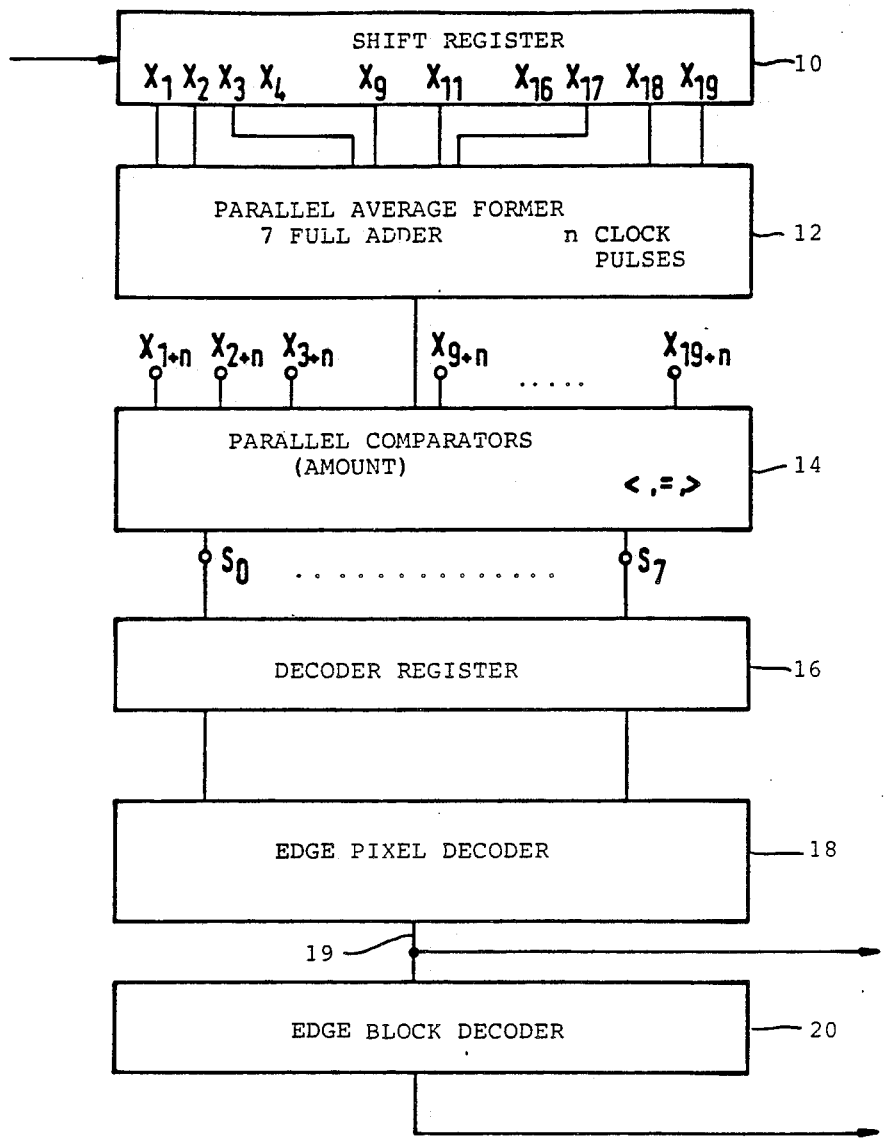
FIG. 1 is a basic circuit diagram of an apparatus for implementing the method according to the invention.

The average intensity value formed in the average former 12 for a particular window is then fed to a parallel comparator unit 14 wherein this average intensity value is individually compared with the intensity value of each of the associated adjacent environment pixels Up taken from the shift register 10 for each image pixel Bp, meanwhile shifted to location 10+n, to derive a possible three-value signal (1, 0, −1) depending on whether the intensity value of an environment pixel Up lies a given amount above (1), within (0) or below (−1) a given tolerance range. All input signals to the comparator unit 14 have an 8 bit resolution. As shown in FIG. 1, for this comparison of the average value from unit 12 with the associated environment pixels in the comparator unit 14, the corresponding environment pixels $Up_{1+n}, ... Up_{19+n}$ that have been shifted forward by n memory locations are utilized. The results of the eight individual comparisons produces eight output signals ($S_0 ... S_7$) from the comparator unit 14, each consisting of one digital value of the possible three-value signal (1, 0, −1).

The three-value signals $S_0 ... S_7$ for each window are intermediately stored in a decoder register 16 wherein they are made available for further processing in a edge pixel decoder 18.

In the edge pixel decoder, 18, a decision is now made whether the respective image pixel Bp is a edge pixel or not and if so, the orientation of the detected edge is determined. More specifically, in the edge pixel decoder 18, a conclusion as to the orientation of a edge is initially drawn from a comparison or observation of the three valued signals $S_0... S_7$ in a contiguous sequence of the eight environment pixels, for example, the pixels Up1, Up2, Up3, Up11, Up19, Up18, Up17, Up9 around an associated image pixel, for example, the pixel Bp10, in that, if there are four immediately consecutive positive values (1) and four immediately consecutive negative values (−1), the border or edge curve is oblique, i.e., not diagonal, horizontal or vertical, and the position of the changes in value (1 to −1) and (−1 to 1) within the sequence of environment pixels Up determines the inclination of the edge curve.

Additionally, a further conclusion as to the orientation of a boundary is drawn from a comparison or observation of the three valued signals $S_0 ... S_7$ in a contiguous sequence of the eight environment pixels Up around one image pixel Bp in that, if the ratio of immediately consecutive positive (1) and negative (−1) values is three/five or, conversely, five/three, the edge curve is determined to be vertical, diagonal or horizontal depending on the particular position of the change in value from a chain of three to a chain of five within the sequence of environment pixels. In particular, for the window shown in FIG. 2, the orientation of an edge curve is determined to be vertical if the change occurs at pixels Up1, Up2 or at pixels Up19, Up18, to be diagonal if the change occurs at pixels Up2, Up3 or at the pixels Up11, Up19, or at pixels Up18, Up17, or to be horizontal if the change occurs at pixels Up3, Up11 or at pixels Up17, Up9. Expressed in more general terms, beginning with environment pixel Up1 in the upper left hand corner of the window or 3×3 matrix of FIG. 2, the orientation of a detected edge curve is determined to be vertical, diagonal or horizontal if the position of the change in value from a consecutive chain of three values (1 or −1) to a consecutive chain of five of the opposite value (−1 or 1) occurs respectively between the first (Up1) and second (Up2) or the fifth (Up19) and sixth (Up18) environment pixels, between the second (Up2) and third (Up3) or between the forth (Up11) and the fifth (Up19), or the sixth (Up18) and seventh (Up17) environment pixels, or between the third (Up3) and forth (Up11) or the seventh (Up17) and eighth (Up9) environment pixels of the sequence.

For each image window processed in the image pixel decoder 18, a binary output signal is produced on the output line 19 indicating whether the image pixel is an edge pixel or not. For example, the binary 1 may be produced on the output line 19 if the image pixel Bp is an edge pixel and a binary 0 may be produced if the image pixel is found not to be associated with an edge curve. As shown in FIG. 1 these binary values on line 19 are fed to a edge block decoder 20.

In the edge block decoder 20, the output signals produced by the edge pixel decoder 18 indicating the presence of an edge pixel are sorted for further processing.

It is then determined in edge block decoder 20 whether the number of identified edge pixels exceed a freely selectable threshold value and whether these detected edge pixels are in immediate local connection and if so identifying this partial image region (block) in its entirety as an edge block.

Correspondingly, the edge block decoder 20 then emits a logic 1 or a logic 0 at its output to thus influence an image coding algorithm.

The significant advantages of the method according to the invention lie in the independence of the edge detection from the decision threshold, the easy technological implementation of the method and the reliable selection capability of the boundary orientation, particularly for oblique edges.

If the luminance component is used for the three valued decision, the brightness has an 8 bit resolution. As to the chrominance component, 8 bit resolution is used also, with the wellknown coding as a tripel based on the primary colours R, G, B. Brightness information in this case is included in said tripel. A well known modification is to use the differential signals R-Y, B-Y, Y (luminance) for 8 bit resolution coding.

To further illustrate the operation of the units shown in FIG. 2, a computer program printout written in the commonly used FORTRAN language is provided in FIGS. 3a to 3i.

It will be understood that the above description of the present invention is susceptible to various modifications, changes and adaptions, and the same are intended to be comprehended within the meaning and range of equivalents of the appended claims.

What is claimed is:

1. A method of detecting the edges in a video signal, with a decision criterion being derived from the environment of a pixel so as to effect image coding with the least number of bits, said method comprising steps of:

subdividing the entire image into partial image regions (blocks) which are non-overlapping and fixed sized and each individually coded as to intensity (luminance or chrominance) components;

from each of these partial image regions, forming a plurality of windows within a block each composed of one image pixel and its immediately adjacent environment pixels;

storing the intensity values of the pixels in a shift register wherein the sequence of said storing is effected linewise from top to bottom within each block;

for each window, reading out only the immediately adjacent environment pixels of an image pixel from the shift register in parallel and calculating an average intensity value from the read out values;

for each said window, individually comparing the respectively determined average value with the associated adjacent environment pixels taken from the shift register for each image pixel and providing a respective output signal having one of three different digital values depending on whether the intensity value of an environment pixel lies above, within, or below a given tolerance range around the average value;

intermediately storing the three valued individual output signals;

and utilizing the three valued output signals to detect an edge and the orientation of such detected edge with the number of the respective values of the output signals and their sequence in a fixed direction around the associated image pixel defining the orientation of the detected edge.

2. A method as defined in claim 1 further comprising the steps of:

identifying each image pixel associated with the detected edge as an edge pixel by providing a respective binary value and each image pixel not associated with a detected edge with the respective other binary value;

determining whether the number of identified edge pixels exceed a freely selectable threshold value and whether these detected edge pixels are in immediate local connections, and if so identifying this partial image region in its entirety as an edge block by means of a binary value;

and utilizing this edge block identifying binary value for an entire partial image region to control an image coding algorithm.

3. A method as defined in claim 1 wherein said three different digital values are a positive value $(+1)$, a zero value $(0)$ and a negative value $(-1)$, respectively.

4. A method as defined in claim 3 wherein there are eight of said environment pixels in each said window, and said step of utilizing includes:

determining the orientation of an edge from a contiguous sequence of said stored individual output signals of the eight environment pixels around one image pixel in that, if there are four immediately consecutive positive values (1) and four immediately consecutive negative values $(-1)$, the edge curve is oblique and the position of the changes in value from positive to negative $(1, -1)$ and from negative to positive $(-1, 1)$ within the sequence of eight environment pixels determines the inclination of the edge curve.

5. A method as defined in claim 4, wherein said step of utilizing further includes: determining the orientation of an edge from the contiguous sequence of the said stored individual output signals of eight environment pixels around one image pixel in that, if the ratio of immediately consecutive positive (1) and negative $(-1)$ values is three/five or, conversely, five/three, the edge curve is determined to be either vertical, diagonal, or horizontal depending on the particular position of the change in value from a chain of three to a chain of five within the sequence of environment pixels.

6. A method as defined in claim 5 wherein each said image pixel and its eight associated environment pixels form a $3\times3$ matrix with the image pixel at the center; and wherein beginning with the environment pixel in the upper left hand corner of said matrix, the orientation of a detected border curve is determined to be vertical, diagonal or horizontal if said position of the change in value from a chain of three to a chain of five occurs respectively between the first and second or the fifth and sixth environment pixels, between the second and third or the sixth and seventh environment pixels, or between the third and forth or the seventh and eighth environment pixels.

7. A method as defined in claim 4, wherein said windows are processed consecutively from image pixel to image pixel of a row of said partial image region.

8. A method as define in claim 3 wherein there are eight said environmental pixels in each said window, and said step of utilizing includes determining the orientation of an edge from a contiguous sequence of the said stored individual output signals of eight environment pixels around one image pixel in that, if the ratio of immediately consecutive positive (1) and negative $(-1)$ values is three/five or, conversely, five/three, the edge curve is determined to be either vertical, diagonal, or horizontal depending on the particular position of the change in value from a chain of three to a chain of five within the sequence of environment pixels.

9. A method as defined in claim 8 wherein each said image pixel and its eight associated environment pixels for a $3\times3$ matrix with image pixel at the center; and wherein beginning with environment pixel in the upper left hand corner of said matrix, the orientation of a detected border curve is determined to be vertical, diagonal or horizontal if said position of the change in value from a chain of three to a chain of five occurs respectively between the first and second or the fifth and sixth environment pixels, between the second and third or the sixth and seventh environment pixels, or between the third and forth or the seventh and eighth environment pixels.

10. A method as defined in claim 9, wherein said windows are processed consecutively from image pixel to image pixel of a row of said partial image region.

* * * * *